Figure 1:
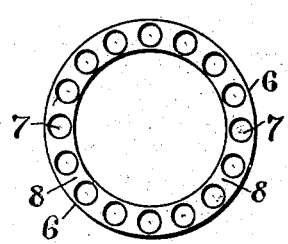

(No Model.)

F. MOSSBERG.
PROCESS OF MAKING CAGES FOR ANTIFRICTION BEARINGS.

No. 487,194. Patented Nov. 29, 1892.

WITNESSES:
Chas. H. Luther Jr.
Henry J. Miller

INVENTOR:
Frank Mossberg
by Joseph A. Miller & Co.
Attys.

UNITED STATES PATENT OFFICE.

FRANK MOSSBERG, OF ATTLEBOROUGH, MASSACHUSETTS, ASSIGNOR TO THE MOSSBERG MANUFACTURING COMPANY, OF SAME PLACE.

PROCESS OF MAKING CAGES FOR ANTIFRICTION-BEARINGS.

SPECIFICATION forming part of Letters Patent No. 487,194, dated November 29, 1892.

Original application filed December 1, 1891, Serial No. 413,659. Divided and this application filed February 24, 1892. Serial No. 422,646. (No model.)

*To all whom it may concern:*

Be it known that I, FRANK MOSSBERG, of Attleborough, in the county of Bristol and State of Massachusetts, have invented certain new and useful Improvements in Processes of Making Cages for Antifriction-Bearings; and I hereby declare that the following is a full, clear, and exact description of the same, reference being had to the accompanying drawings, forming part of this specification.

This invention has reference to improvements in processes of making cages for antifriction-bearings, the objects being to form said cages in a manner which will produce perfectly-parallel bearings for the rolls or balls held therein and to regulate the extension of the rolls or balls from the inner and outer surfaces thereof, this application being a division of the application for Letters Patent for improvements in antifriction-bearings and method of making the same, filed by me December 1, 1891, Serial No. 413,659.

The invention consists in the peculiar and novel combination of steps by which a sleeve of metal is transformed into a cage consisting of longitudinal parallel bars having concaved opposite surfaces to form bearings for the antifriction devices, said bars being strengthened and held together by solid end flanges integral therewith, through one of which flanges perforations are formed for the introduction of said antifriction devices.

Cages of the nature described have generally been formed from sleeves having inner and outer circumferences equal to those of the finished cages, the ends of these sleeves being longitudinally perforated by drills of a larger diameter than the thickness of the material of the sleeve, thus forming bars having longitudinally-concaved surfaces and openings through which a portion of the antifriction devices, whether balls or rolls, extend. In actual practice this drilling process is found to be most difficult and expensive owing to the natural tendency of the drills to travel in the direction of the least resistance, which is toward the inner or outer surface of the sleeve. This defect can be overcome only by careful gaging and guiding, while the services of a most thorough machinist are required. The further objection to the usual method of forming said cages is from the fact that the bars of the finished cages are supported but from one end, as the entire metal between the bars at the end from which the drilling is commenced must be removed by that operation. Consequently any slight defect in the construction will, when the bearing is in use, cause a torsional strain to be exerted on the bars, which will greatly increase the friction of the devices held between them and rapidly destroy the effectiveness of the device. Collars or caps are sometimes secured to the separated ends of the bars; but as these are usually small no great additional strength can be secured thereby.

Figure 2:
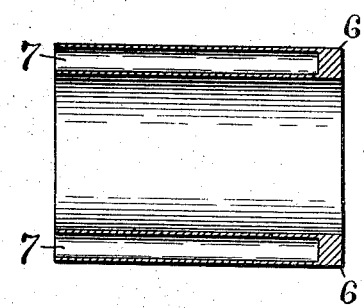
Figure 3:
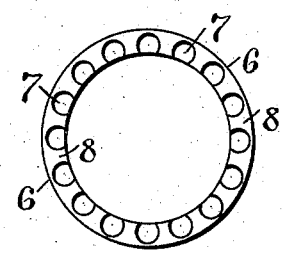
Figure 4:
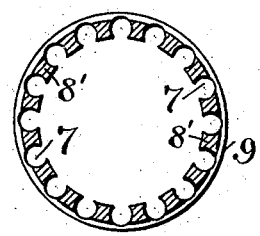
Figure 5:
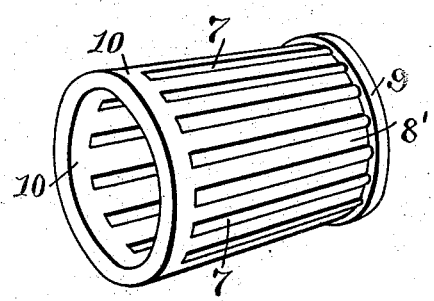

Figure 1 represents an end view of a sleeve after being subjected to the drilling process. Fig. 2 represents a longitudinal sectional view of the same. Fig. 3 represents an end view of the same after the interior surface of the sleeve has been turned away. Fig. 4 represents a cross-sectional view of the completed sleeve. Fig. 5 represents a perspective view of the same to more clearly indicate the strengthening-flanges.

In the drawings the numeral 6 indicates a metal sleeve into which the longitudinal bores 7 7 have been drilled for nearly the length of the sleeve, as represented in Fig. 2, 8 8 being the metal between these bores, which in the finished article becomes bars 8' 8', 9 indicating a flange left at one end of the device by the turning down of the outer surface of the sleeve 6, and 10 that portion of the sleeve 6 left at the end opposite the flange 9 after the inner and outer surfaces of the sleeve have been cut away.

In carrying out my invention I take a sleeve 6, having an outer circumference slightly greater than the outer bearing-surface of the proposed device and a bore slightly less in diameter than the proposed inner bearing-surface of such device. In the material of this sleeve and starting from one end I drill the bores 7 7, extending nearly the length of the sleeve, the material of the sleeve 6 being sufficient in thickness to act on the drill as would a solid piece of metal. I now turn the inner surface of the sleeve away for the whole of its length, as shown in Fig. 3, cutting away at the same time a portion of the metal 8 8 between the bores 7 7, so that if rolls of the diameter of these bores be introduced therein a portion of the circumference of the rolls will extend beyond the new inner walls of the sleeve. I then turn the outer surface of the sleeve down in like manner, starting from the end opposite to that from which the bores were drilled for the whole or a greater portion of its length, in some cases preferring to leave a strengthening-flange 9.

After the process thus described the bores 7 7 become bearings having open sides, the metal 8 8 becomes bars 8' 8', the metal of the sleeve at the end opposite to that from which the bores were drilled being left to connect and strengthen these bars.

By this process the cost of manufacture is greatly reduced and a more perfect and much stronger article is produced.

Having thus described my invention, I claim as new and desire to secure by Letters Patent—

The process herein described of forming cages for antifriction-bearings, consisting in boring a series of parallel holes in the walls of a metal sleeve, extending nearly the length of the same, then cutting away the inner surface of said sleeve to a depth beyond the circumference of said bores, and, finally, cutting away the outer surface of the sleeve in a like degree for the whole or a greater portion of its length, as and for the purpose described.

In witness whereof I have hereunto set my hand.

FRANK MOSSBERG.

Witnesses:
JOSEPH A. MILLER,
JOSEPH A. MILLER, Jr.